United States Patent
Suzuki et al.

(10) Patent No.: US 8,263,690 B2
(45) Date of Patent: Sep. 11, 2012

(54) POLYLACTIC ACID COMPOSITION

(75) Inventors: Hirotaka Suzuki, Iwakuni (JP); Kiyotsuna Toyohara, Iwakuni (JP); Yuka Komazawa, Chuo-ku (JP)

(73) Assignees: Teijin Limited, Osaka (JP); Musashino Chemical Laboratory, Ltd, Tokyo (JP)

( * ) Notice: Subject to any disclaimer, the term of this patent is extended or adjusted under 35 U.S.C. 154(b) by 0 days.

(21) Appl. No.: 12/294,549

(22) PCT Filed: Mar. 28, 2007

(86) PCT No.: PCT/JP2007/057515
§ 371 (c)(1),
(2), (4) Date: Sep. 25, 2008

(87) PCT Pub. No.: WO2007/114459
PCT Pub. Date: Oct. 11, 2007

(65) Prior Publication Data
US 2009/0062437 A1   Mar. 5, 2009

(30) Foreign Application Priority Data
Mar. 31, 2006   (JP) ................... 2006-096900

(51) Int. Cl.
*C07F 9/40* (2006.01)
(52) U.S. Cl. .................. 524/131; 264/331.18; 524/415; 524/437; 524/556
(58) Field of Classification Search .............. 523/131
See application file for complete search history.

(56) References Cited

U.S. PATENT DOCUMENTS

| | | | |
|---|---|---|---|
| 5,686,540 A | 11/1997 | Kakizawa | |
| 5,760,118 A | 6/1998 | Sinclair et al. | |
| 5,770,682 A | 6/1998 | Ohara et al. | |
| 6,127,512 A | 10/2000 | Asrar et al. | |
| 6,924,349 B2 * | 8/2005 | Lee et al. | 528/272 |
| 7,531,585 B2 | 5/2009 | Ozawa et al. | |
| 2005/0001358 A1 * | 1/2005 | Nakazawa et al. | 264/331.18 |

FOREIGN PATENT DOCUMENTS

| | | |
|---|---|---|
| EP | 1 593 705 A1 | 9/2005 |
| JP | 49-125494 A | 11/1974 |
| JP | 9-31171 A | 2/1997 |
| JP | 9-104809 A | 4/1997 |
| JP | 10-36651 A | 2/1998 |
| JP | 2862071 B2 | 12/1998 |
| JP | 11-021438 A | 1/1999 |
| JP | 3487388 B2 | 10/2003 |
| JP | 3513972 B2 | 1/2004 |
| JP | 2004-190025 A | 7/2004 |
| JP | 2004-277939 A | 10/2004 |
| JP | 2005-248032 A | 9/2005 |
| WO | 2005/097894 A1 | 10/2005 |

OTHER PUBLICATIONS

Database WPI Week 200470; Thomson Scientific, London, GB, AN 2004-712937 (2004).

* cited by examiner

*Primary Examiner* — Doris Lee
(74) *Attorney, Agent, or Firm* — Sughrue Mion, PLLC

(57) ABSTRACT

It is an object of the present invention to provide a composition which contains polylactic acid and has excellent heat stability, mechanical strength and color. The composition contains 0.001 to 0.1 part by weight of a metal catalyst and 0.001 to 0.5 part by weight of a phosphono-fatty acid ester based on 100 parts by weight of polylactic acid.

6 Claims, No Drawings

POLYLACTIC ACID COMPOSITION

TECHNICAL FIELD

The present invention relates to a composition containing polylactic acid. More specifically, it relates to a composition which contains polylactic acid, has excellent heat stability, mechanical strength and color, and can be stored for a long time.

BACKGROUND ART

Since most plastics are light in weight, tough and durable and can be molded easily and arbitrarily, they are mass-produced to support our lives in many ways. However, when plastics are thrown away into the environment, they are not easily decomposed and are accumulated. When they are burnt, they emit a large amount of carbon dioxide, thereby accelerating global warming.

In view of this situation, researches into resins made from non-oil raw materials or biodegradable plastics which are degraded by microorganisms are now actively under way. The biodegradable plastics have an aliphatic carboxylate unit and are easily degraded by microorganisms. However, they have low heat stability and a serious problem such as a reduction in their molecular weights or the deterioration of their colors in the step where they are exposed to a high temperature, such as melt spinning, injection molding or melt film formation.

Although polylactic acid, out of the degradable plastics, is a plastic which has excellent heat resistance and good balance between color and mechanical strength, when it is compared with petroleum-based resins typified by polyethylene terephthalate and polyamide, there is still a world of difference in heat stability between it and the petroleum-based resins. To overcome this situation, various studies have been made on the improvement of the heat stability of polylactic acid. For example, Patent Document 1 proposes that a phosphoric acid-based compound or phosphorous acid-based compound is added to polylactic acid as a catalyst deactivator when the molecular weight reaches 50,000 or more. Patent Documents 2 and 3 teach that an acidic phosphate or chelating agent is added as a catalyst deactivator to improve the heat stability of polylactic acid. However, the addition of the catalyst deactivator to the low-molecular weight polylactic acid as in Patent Document 1 impedes a subsequent polymerization reaction, thereby making it impossible to obtain a high-molecular weight polymer. Meanwhile, the acidic phosphate disclosed by Patent Documents 2 and 3 causes the corrosion of production equipment or the deterioration of the hydrolytic resistance of the resin due to its acidity. The chelating agent enumerated above generally has low heat resistance and burns before a metal catalyst is supplied, thereby causing serious coloration and bad smell.

As described above, a polylactic acid composition which suppresses both opening polymerization caused by the residual polymerization catalyst and a reduction in molecular weight by the disconnection of the main chain and has excellent heat stability is not proposed yet.
(Patent Document 1) Japanese Patent No. 2862071
(Patent Document 2) Japanese Patent No. 3487388
(Patent Document 3) JP-A 10-36651

DISCLOSURE OF THE INVENTION

It is an object of the present invention to provide a composition which contains polylactic acid and has excellent heat stability and color. It is another object of the present invention to provide a composition which has a high content of a stereocomplex crystal and excellent heat resistance.

The inventors of the present invention have found that, when a phosphono-fatty acid ester is contained in polylactic acid, the residual catalyst contained in the polylactic acid can be deactivated effectively, thereby making it possible to improve the heat stability and color of the polylactic acid. The present invention has been accomplished based on this finding.

That is, according to the present invention, there is provided a composition which contains 0.001 to 0.1 part by weight of a metal catalyst and 0.001 to 0.5 part by weight of a phosphono-fatty acid ester based on 100 parts by weight of polylactic acid. According to the present invention, there is provided a molded product of the composition. Further, according to the present invention, there is provided a process of manufacturing a composition which contains a stereocomplex crystal by mixing together poly-L-lactic acid and poly-D-lactic acid, wherein at least one of poly-L-lactic acid and poly-D-lactic acid contains a metal catalyst and the mixing is carried out in the presence of 0.001 to 0.5 part by weight of a phosphono-fatty acid ester based on 100 parts by weight of the total of poly-L-lactic acid and poly-D-lactic acid.

BEST MODE FOR CARRYING OUT THE INVENTION

<Composition>
(Polylactic Acid)

Polylactic acid is a polymer essentially composed of a lactic acid unit represented by the following formula. The polylactic acid is preferably poly-L-lactic acid, poly-D-lactic acid or a mixture thereof. The poly-L-lactic acid is a polymer which contains an L-lactic acid unit as the main component and the poly-D-lactic acid is a polymer which contains a D-lactic acid unit as the main component.

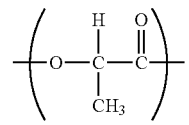

The poly-L-lactic acid contains preferably 90 to 100 mol %, more preferably 95 to 100 mole, much more preferably 98 to 100 mol % of an L-lactic acid unit. Other units include a D-lactic acid unit and units other than lactic acid. The total amount of the D-lactic acid unit and units other than lactic acid is preferably 0 to 10 mol %, more preferably 0 to 5 mol %, much more preferably 0 to 2 mol %.

The poly-D-lactic acid contains preferably 90 to 100 mol %, more preferably 95 to 100 mol %, much more preferably 98 to 100 mol % of a D-lactic acid unit. Other units include an L-lactic acid unit and units other than lactic acid. The total amount of the L-lactic acid unit and units other than lactic acid is preferably 0 to 10 mol %, more preferably 0 to 5 mol %, much more preferably 0 to 2 mol %.

The units other than lactic acid include units derived from dicarboxylic acids, polyhydric alcohols, hydroxycarboxylic acids and lactones having a functional group capable of forming at least two ester bonds and units derived from polyesters, polyethers and polycarbonates comprising these as constituent components.

The dicarboxylic acids include succinic acid, adipic acid, azelaic acid, sebacic acid, terephthalic acid and isophthalic acid. The polyhydric alcohols include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol, and polypropylene glycol, and aromatic polyhydric alcohols such as an adduct of bisphenol with ethylene oxide. The hydroxycarboxylic acids include glycolic acid and hydroxybutyric acid. The lactones include glycollide, ε-caprolactone glycollide, ε-caprolactone, β-propiolactone, δ-butyrolactone, β- or γ-butyrolactone, pivalolactone and δ-valerolactone.

The weight average molecular weight (Mw) of the poly-L-lactic acid or poly-D-lactic acid is preferably 50,000 to 500,000, more preferably 150,000 to 350,000. The weight average molecular weight is a value in terms of standard polystyrene measured by gel permeation chromatography (GPC) using chloroform as an eluent.

The poly-L-lactic acid and the poly-D-lactic acid can be manufactured by known methods. For example, they can be manufactured by heating L-lactide and D-lactide in the presence of a metal catalyst for ring opening polymerization, respectively. Alternatively, they can be manufactured by heating low-molecular weight polylactic acid which contains a metal catalyst under a reduced pressure or in an inert gas stream for solid-phase polymerization after they are crystallized. Further, they can be manufactured by direct polymerization in which lactic acid is dehydrated and condensed in the presence or absence of an organic solvent.

The polymerization reaction can be carried out in a conventionally known reactor, for example, vertical reactors equipped with a high viscosity stirring blade such as helical ribbon blade, which may be used alone or in combination. An alcohol may be used as a polymerization initiator. The alcohol preferably does not impede the polymerization of polylactic acid and is nonvolatile, as exemplified by decanol, dodecanol, tetradecanol, hexadecanol, octadecanol, ethylene glycol, triethylene glycol and benzyl alcohol.

In the solid-phase polymerization method, a relatively low-molecular weight lactic acid polyester obtained by the above ring-opening polymerization or the direct polymerization of lactic acid is used as a prepolymer. It is preferred from the viewpoint of preventing fusion that the prepolymer should be crystallized at a temperature of its glass transition temperature (Tg) or higher and lower than its melting point (Tm) in advance. The crystallized prepolymer is charged into a fixed vertical reactor or a rotary reactor such as tumbler or kiln and heated at the glass transition temperature (Tg) or higher and lower than the melting point (Tm). There will be no problem if the polymerization temperature is raised stepwise along with the proceeding of polymerization. It is also preferred that the inside of the reactor should be reduced or the heated inert gas stream should be circulated in order to remove water generated during solid-phase polymerization effectively.

The polylactic acid preferably contains a stereocomplex crystal. This polylactic acid containing a stereocomplex crystal is called "stereocomplex polylactic acid". This stereocomplex polylactic acid has a high melting point and excellent heat resistance. The stereocomplex crystal is formed by mixing together poly-L-lactic acid and poly-D-lactic acid. In this case, the weight ratio of the poly-L-lactic acid to the poly-D-lactic acid is preferably 90/10 to 10/90, more preferably 75/25 to 25/75, much more preferably 60/40 to 40/60.

The weight average molecular weight of the stereocomplex polylactic acid is preferably 100,000 to 500,000, more preferably 100,000 to 300,000. The weight average molecular weight is a value in terms of standard polystyrene measured by gel permeation chromatography (GPC) using chloroform as an eluent.

The content of the stereocomplex crystal is preferably 80 to 100%, more preferably 95 to 100. In the stereocomplex polylactic acid in the present invention, the proportion of melting peaks at 195° C. or higher to melting peaks in the temperature elevation process measured by a differential scanning calorimeter (DSC) is preferably 80% or more, more preferably 90% or more, much more preferably 95% or more. The melting point is preferably 195 to 250° C., more preferably 200 to 220° C. The enthalpy of melting is preferably 20 J/g or more, more preferably 30 J/g or more. More specifically, it is preferred that the proportion of melting peaks at 195° C. or higher to melting peaks in the temperature elevation process measured by the differential scanning calorimeter (DSC) be 90% or more, the melting point be 195 to 250° C., and the enthalpy of melting be 20 J/g or more.

The stereocomplex polylactic acid can be manufactured by mixing together poly-L-lactic acid and poly-D-lactic acid in a predetermined weight ratio. The mixing can be carried out in the presence of a solvent. The solvent is not particularly limited if it can dissolve poly-L-lactic acid and poly-D-lactic acid. Preferred examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which are used alone or in combination of two or more. The mixing may be carried out in the absence of a solvent. That is, poly-L-lactic acid and poly-D-lactic acid are melt kneaded together. Stated more specifically, a method in which predetermined amounts of poly-L-lactic acid and poly-D-lactic acid are mixed together and then melt kneaded together, or a method in which any one of them is molten and then the other is added to and kneaded with the molten one may be employed.

(Metal Catalyst)

The metal catalyst is preferably a compound which contains at least one metal selected from the group consisting of alkali earth metals, rare earth metals, third row transition metals, aluminum, germanium, tin and antimony. The alkali earth metals include magnesium, calcium and strontium. The rare earth metals include scandium, yttrium, lanthanum and cerium. The third row transition metals include iron, cobalt, nickel and zinc.

The metal catalyst can be added to the polylactic acid as a carboxylate, alkoxide or aryloxide of one of these metals, or enolate of β-diketone. When polymerization activity and color are taken into consideration, tin octylate, titanium tetraisopropoxide and aluminum triisopropoxide are particularly preferred.

The content of the metal catalyst is 0.001 to 0.1 part by weight, preferably 0.005 to 0.05 part by weight based on 100 parts by weight of the polylactic acid. When the content of the metal catalyst is too low, the polymerization rate greatly drops disadvantageously. When the content is too high, coloring occurs by reaction heat, or opening polymerization or ester interchange reaction is accelerated, whereby the color and heat stability of the obtained composition become worse.

The content of the metal catalyst is $2\times10^{-4}$ to 0.05 part by weight, preferably $1\times10^{-3}$ to 0.03 part by weight based on 100 parts by weight of the polylactic acid as a metal element. The amount of the metal element can be determined by ICP emission analysis.

(Phosphono-Fatty Acid Ester)

The phosphono-fatty acid ester used in the present invention is a compound in which a diester phosphonate moiety and a carboxylate moiety are bonded together by an aliphatic hydrocarbon group. Since this phosphono-fatty acid ester is achromatic and transparent and has excellent heat resistance, the obtained composition has a good color. Particularly, a phosphono-fatty acid ester having a chemical structure of the following formula (1) provides a good result to the object of the present invention.

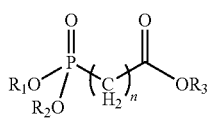

(1)

In the above formula, $R_1$, $R_2$ and $R_3$ are each independently an alkyl group having 1 to 20 carbon atoms or aryl group having 6 to 12 carbon atoms. Examples of the alkyl group include ethyl group, propyl group, butyl group, pentyl group, hexyl group, decyl group and octadecyl group. Examples of the aryl group include phenyl group and naphthalene-yl group. The aryl group may be substituted by a halogen atom or alkyl group having 1 to 8 carbon atoms. Examples of the substituent halogen atom include fluorine atom, chlorine atom and bromine atom. Examples of the substituent alkyl group include ethyl group, propyl group, butyl group, pentyl group and hexyl group. $R_1$ to $R_3$ may be the same or different. n is an integer of 1 to 3.

Examples of the compound represented by the formula (1) include ethyl diethylphosphonoacetate, ethyl di-n-propylphosphonoacetate, ethyl di-n-butylphosphonoacetate, ethyl di-n-hexylphosphonoacetate, ethyl di-n-octylphosphonoacetate, ethyl di-n-decylphosphonoacetate, ethyl di-n-dodecylphosphonoacetate, ethyl di-n-octadecylphosphonoacetate, ethyl diphenylphosphonoacetate, decyl diethylphosphonoacetate, dodecyl diethylphosphonoacetate, octadecyl diethylphosphonoacetate, ethyl diethylphosphonopropionate, ethyl di-n-propylphosphonopropionate, ethyl di-n-butylphosphonopropionate, ethyl di-n-hexylphosphonopropionate, ethyl di-n-octylphosphonopropionate, ethyl di-n-decylphosphonopropionate, ethyl di-n-dodecylphosphonopropionate, ethyl di-n-octadecylphosphonopropionate, ethyl diphenylphosphonopropionate, decyl diethylphosphonopropionate, dodecyl diethylphosphonopropionate, octadecyl diethylphosphonopropionate, ethyl diethylphosphonobutyrate, ethyl di-n-propylphosphonobutyrate, ethyl di-n-butylphosphonobutyrate, ethyl di-n-hexylphosphonobutyrate, ethyl di-n-octylphosphonobutyrate, ethyl di-n-decylphosphonobutyrate, ethyl di-n-dodecylphosphonobutyrate, ethyl di-n-octadecylphosphonobutyrate, ethyl diphenylphosphonobutyrate, decyl diethylphosphonobutyrate, dodecyl diethylphosphonobutyrate and octadecyl diethylphosphonobutyrate.

Ethyl diethylphosphonoacetate, ethyl di-n-propylphosphonoacetate, ethyl di-n-butylphosphonoacetate, ethyl di-n-hexylphosphonoacetate, decyl diethylphosphonoacetate and octadecyl diethylphosphonoacetate are preferred from the viewpoint of efficacy and handling ease.

In the formula (1), when the number of carbon atoms of $R_1$ to $R_3$ is 20 or less, the melting point of the phosphono-fatty acid ester becomes lower than the production temperature of the polylactic acid or the composition, whereby it can be fully molten and mixed and capture the metal catalyst efficiently. The phosphono-fatty acid ester has an aliphatic hydrocarbon group between the diester phosphonate moiety and the carboxylate moiety. To capture the metal catalyst contained in the polylactic acid efficiently, in the formula (1), n is preferably an integer of 1 to 3.

The content of the phosphono-fatty acid ester is 0.001 to 0.5 part by weight, preferably 0.02 to 0.2 part by weight based on 100 parts by weight of the polylactic acid. When the content of the phosphono-fatty acid ester is too low, the deactivation efficiency of the residual metal catalyst becomes extremely low, thereby making it impossible to obtain a satisfactory effect. When the content is too high, the contamination of a mold or a nozzle used at the time of molding or spinning becomes marked.

To mix the phosphono-fatty acid ester with the polylactic acid in the present invention, they may be added without being diluted or after they are diluted. For example, when a liquid phosphono-fatty acid ester or a solid phosphono-fatty acid ester having a melting point of lower than 150° C. is used, it may be added to a reactor directly to be kneaded in the latter stage of polymerization in the ring-opening polymerization method. It may be kneaded in an extruder or kneader as a master batch which is a molded chip. The use of an extruder or kneader is preferred from the viewpoint of a uniform distribution in the polylactic acid. It is also preferred that the phosphono-fatty acid ester should be added from a side feeder by connecting the discharge part of a reactor to an extruder directly. Meanwhile, in the solid-phase polymerization method, it is possible to knead solid polylactic acid obtained at the end of polymerization with the phosphono-fatty acid ester in an extruder or kneader, to knead the solid polylactic acid with a master batch containing the phosphono-fatty acid ester by an extruder or kneader, to contact the chip directly to steam of the phosphono-fatty acid ester, or to immerse or spray the chip with a solution of the phosphono-fatty acid ester.

<Process of Manufacturing Composition>

The present invention includes a process of manufacturing a composition which contains a stereocomplex crystal by mixing together poly-L-lactic acid and poly-D-lactic acid, wherein at least one of poly-L-lactic acid and poly-D-lactic acid contains a metal catalyst and the mixing is carried out in the presence of 0.001 to 0.5 part by weight, preferably 0.02 to 0.2 part by weight of a phosphono-fatty acid ester based on 100 parts by weight of the total of poly-L-lactic acid and poly-D-lactic acid. As for the poly-L-lactic acid, the poly-D-lactic acid, the metal catalyst and the process of manufacturing the phosphono-fatty acid ester, please refer to the section for the composition.

The mixing may be carried out in the presence of a solvent. The solvent is not particularly limited if it can dissolve poly-L-lactic acid and poly-D-lactic acid. Preferred examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which are used alone or in combination of two or more. The mixing may be carried out in the absence of a solvent. That is, poly-L-lactic acid and poly-D-lactic acid may be melt kneaded together. Stated more specifically, a method in which predetermined amounts of poly-L-lactic acid and poly-D-lactic acid are mixed together and then melt kneaded together, or a method in which any one of them is molten and then the other is added to and kneaded with the molten one may be employed.

In the above method, the following poly-L-lactic acid and poly-D-lactic acid are mixed together. The symbols denote the following substances.

(L) poly-L-lactic acid containing substantially no metal catalyst
(Lc) poly-L-lactic acid containing a metal catalyst
(Lcp) poly-L-lactic acid containing a metal catalyst and a phosphono-acetate (D) poly-D-lactic acid containing substantially no metal catalyst
(Dc) poly-D-lactic acid containing a metal catalyst
(Dcp) poly-D-lactic acid containing a metal catalyst and a phosphono-acetate
(P) phosphono-fatty acid ester
Mode 1: (L) and (Dcp) are mixed together.
Mode 2: (L), (Dc) and (P) are mixed together.
Mode 3: (Lc), (D) and (P) are mixed together.
Mode 4: (Lc), (Dc) and (P) are mixed together.
Mode 5: (Lc) and (Dcp) are mixed together.
Mode 6: (Lcp) and (D) are mixed together.
Mode 7: (Lcp) and (Dc) are mixed together.
Mode 8: (Lcp) and (Dcp) are mixed together.

In the method, the composition of the present invention is preferably manufactured by mixing together (i) a composition obtained by adding a phosphono-fatty acid ester to poly-L-lactic acid manufactured in the presence of a metal catalyst and (ii) a composition obtained by adding a phosphono-fatty acid ester to poly-D-lactic acid manufactured in the presence of a metal catalyst. The mixing can be carried out in the presence of a solvent. They may be melt kneaded together in the absence of a solvent.

The composition of the present invention has excellent color and heat stability, a reduction in the molecular weight of the composition at the time of heating is dramatically suppressed, and the composition can be advantageously used for melt spinning, melt film formation and injection molding. The composition of the present invention may be molded into a fiber, film or other form. The molded product may contain additives which are generally used for ordinary resin molded products, such as deterioration inhibitors including antioxidant, weatherproofer, light resisting agent and hydrolysis resisting agent, molding aids including flame retardant, nucleating agent, lubricant, talc, glass fiber, natural fiber, chemical fiber, cut fiber and whisker, pigment and dye.

EXAMPLES

The following examples are provided for the purpose of further illustrating the present invention but are in no way to be taken as limiting. Physical properties were measured by the following methods.

[1] Heat Stability Test 10 g of the composition was put into a stoppered Pyrex test tube, the inside of the tube was substituted by nitrogen, and the tube was kept at 260° C. for 10 minutes and 60 minutes to carry out a heat stability test. The weight average molecular weights (Mw) of the composition before and after the heat stability test were measured by GPC to be compared with each other so as to evaluate its heat stability.

[2] Weight Average Molecular Weight (Mw)

The weight average molecular weight (Mw) was measured with the GPC-11 of Showdex Co., Ltd. by dissolving 50 mg of the composition in 5 ml of chloroform at 40° C. The weight average molecular weight (Mc) was calculated as a value in terms of polystyrene.

[3] Content of Lactide in Composition

The content of lactide in the composition was measured in heavy chloroform by using the JNM-EX270 nuclear magnetic resonance spectral meter of JEOL Ltd. and calculated as the area ratio of a quadruple line peak (4.98 to 5.05 ppm) derived from lactide to a quadruple line peak (5.10 to 5.20 ppm) derived from polylactic acid.

[4] Content of Stereocomplex Crystal in Composition

The content of the stereocomplex crystal was calculated from the melting enthalpy ΔHA of a crystal melting point which appeared at 150° C. or higher and lower than 190° C. and the melting enthalpy ΔHB of a crystal melting point which appeared at 190° C. or higher and lower than 250° C. in a differential scanning calorimeter (DSC) based on the following equation (2).

$$\text{Content of stereocomplex crystal} = \{\Delta HB/(\Delta HA + \Delta HB)\} \times 100\% \quad (2)$$

[5] Color (ΔYI Value)

The YI value of a specimen which had undergone the heat stability test described in the above paragraph [1] for 60 minutes and the YI value of a 1 wt % dichloromethane solution of the sample before the test were measured with the UV-2400PC ultraviolet-visible spectrometer of Shimadzu Corporation. The YI value was calculated from tristimulus values X, Y and Z based on the following equation (3). The ΔYI value as a color index was calculated from the following equation (4).

$$YI\text{ value} = 100 \times (1.28X - 1.06Z)/Y \quad (3)$$

$$\Delta YI\text{ value} = YI(\text{after heat stability test}) - YI(\text{before heat stability test}) \quad (4)$$

Reference Example 1

Synthesis of Ethyl Diethylphosphonoacetate 100 parts by weight of triethyl phosphite and 100 parts by weight of ethyl bromoacetate were put into a reactor equipped with a distillation tube, and the inside of the reactor was substituted by nitrogen. Subsequently, the reactor was heated at 100° C. to start a reaction. Since bromoethane as a by-product began to distill out immediately, the reaction was maintained until the distillation-out of bromoethane slowed down. When the distillation-out of bromoethane became moderate, the reactor was further heated at 150° C. to continue the reaction for 3 hours. The reaction mixture was distilled at 180° C. under a normal pressure to obtain an achromatic transparent liquid (yield of 95%, boiling point of 177° C./760 mmHg).

Reference Example 2

Synthesis of Ethyl Dibutylphosphonoacetate 100 parts by weight of tributyl phosphite and 66 parts by weight of ethyl bromoacetate were put into a reactor equipped with a distillation tube, and the inside of the reactor was substituted by nitrogen. Subsequently, the reactor was heated at 120° C. to start a reaction. Since bromobutane as a by-product began to distill out immediately, the reaction was maintained until the distillation-out of bromoethane slowed down. When the distillation-out of bromoethane became moderate, the reactor was further heated at 170° C. to continue the reaction for 3 hours. The reaction mixture was distilled at 180° C. under a reduced pressure to obtain an achromatic transparent liquid (yield of 88%, boiling point of 249° C./760 mmHg).

Reference Example 3

Synthesis of ethyl d-n-hexylphosphonoacetate 100 parts by weight of trihexyl phosphite and 100 parts by weight of ethyl bromoacetate were put into a reactor, and the inside of the reactor was substituted by nitrogen. Subsequently, the reactor was heated at 170° C. to carry out a reaction for 3 hours while these substances were heated and refluxed. After excess of ethyl bromoacetate was distilled off at 80° C. under a reduced pressure, the reaction mixture was distilled at 190° C. under a reduced pressure to obtain an achromatic transparent liquid (yield of 84%, boiling point of 146° C./0.5 mmHg).

Reference Example 4

Synthesis of Octadecyl Diethylphosphonoacetate 100 parts by weight of triethyl phosphite and 235 parts by weight of octadecyl bromoacetate were put into a reactor equipped with a distillation tube, and the inside of the reactor was substituted by nitrogen. Subsequently, the reactor was heated at 100° C. to start a reaction. Since bromoethane as a by-product began to distill out immediately, the reaction was maintained until the distillation-out of bromoethane slowed down. When the distillation-out of bromoethane became moderate, the reactor was further heated at 150° C. to continue the reaction for 3 hours. The reaction mixture was cooled to room temperature to obtain a precipitate. The precipitate was collected by filtration and recrystallized with acetone to obtain a white plate-like crystal (yield of 98%, melting point of 28 to 31° C.).

Reference Example 5

Synthesis of Ethyl Diethylphosphonopropionate

The operation of Reference Example 1 was repeated except that 108 parts by weight of ethyl bromopropionate was used in place of 100 parts by weight of ethyl bromoacetate to synthesize ethyl diethylphosphonopropionate.

Reference Example 6

Synthesis of ethyl di-n-hexylphosphonopropionate

The operation of Reference Example 3 was repeated except that 108 parts by weight of ethyl bromopropionate was used in place of 100 parts by weight of ethyl bromoacetate to synthesize ethyl di-n-hexylphosphonopropionate.

Example 1

100 parts by weight of L-lactide and 0.15 part by weight of stearyl alcohol were fed to a polymerization reactor equipped with a cooling distillation tube from a stock feed port in a nitrogen stream. Subsequently, the inside of the reactor was substituted by nitrogen 5 times, and L-lactide was molten at 190° C. When L-lactide was completely molten, a solution of 0.005 part by weight of tin 2-ethylhexanoate dissolved in 500 μl of toluene was added from the stock feed port to carry out polymerization at 190° C. for 1 hour. After the end of polymerization, 0.055 part by weight of ethyl diethylphosphonoacetate was added from the stock feed port and kneaded for 15 minutes. Finally, excess of L-lactide was removed by volatilization, and a composition was discharged from the reactor. The Mw and lactide content of the obtained composition are shown in Table 1.

The obtained composition was ground into grains having a diameter of 2 to 5 mm by using a grinder, and 10 g of the grains was put into a stoppered Pyrex test tube. The inside of the Pyrex test tube was substituted by nitrogen to carry out a heat stability test at 260° C. for 10 minutes and 60 minutes. After the end of the test, the composition was taken out to measure its Mw, lactide content and ΔYI value. The measurement results are shown in Table 1.

Example 2

A composition was prepared in the same manner as in Example 1 except that 0.069 part by weight of ethyl di-n-butylphosphonoacetate was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Example 3

A composition was prepared in the same manner as in Example 1 except that 0.082 part by weight of ethyl di-n-hexylphosphonoacetate was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Example 4

A composition was prepared in the same manner as in Example 1 except that 0.111 part by weight of octadecyl diethylphosphonoacetate was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Example 5

A composition was prepared in the same manner as in Example 1 except that 0.059 part by weight of ethyl diethylphosphonopropionate was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Example 6

A composition was prepared in the same manner as in Example 1 except that 0.085 part by weight of ethyl di-n-hexylphosphonopropionate was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Comparative Example 1

A composition was prepared in the same manner as in Example 1 except that 0.041 part by weight of triethyl phosphite was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Comparative Example 2

A composition was prepared in the same manner as in Example 1 except that 0.077 part by weight of triphenyl phosphite was used in place of 0.055 part by weight of ethyl diethylphosphonoacetate. The Mw and lactide content of the obtained composition are shown in Table 1. A heat stability test was carried out in the same manner as in Example 1. The results are shown in Table 1.

Comparative Example 3

A composition was prepared in the same manner as in Example 1 except that ethyl diethylphosphonoacetate was not added. The Mw and lactide content of the obtained composition are shown in Table 1. A heat stability test was carried out in the same manner as in Example 1. The results are shown in Table 1.

D-lactide and 0.15 part by weight of stearyl alcohol were fed to a reactor, the inside of the reactor was then substituted by nitrogen 5 times, and D-lactide was molten at 190° C. When D-lactide was completely molten, 0.05 part by weight of tin 2-ethylhexanoate and 500 μl of toluene were added from the stock feed port to carry out polymerization at 190° C. for 1 hour. After the end of polymerization, 0.055 part by weight of ethyl diethylphosphonoacetate was added from a catalyst injection port and kneaded for 15 minutes. Finally, excess of D-lactide was removed by volatilization, and a poly-D-lactic acid composition in the form of a strand was discharged from the discharge port of the reactor and cut into a pellet while it was cooled.

TABLE 1

| | Deactivator | | Mw (unit: $10^4$) | | | Lactide content (wt %) | | | |
|---|---|---|---|---|---|---|---|---|---|
| | Type | Parts by weight | Before heat stability test | After 10 minutes | After 60 minutes | Before heat stability test | After 10 minutes | After 60 minutes | ΔYI |
| Ex. 1 | Ethyl Diethylphosphono acetate | 0.055 | 28.1 | 26.1 | 13.2 | 4.7 | 4.7 | 4.9 | 0.70 |
| Ex. 2 | Ethyl di-n-butylphosphono acetate | 0.069 | 25.7 | 23.7 | 12.9 | 4.4 | 4.3 | 4.9 | 0.67 |
| Ex. 3 | Ethyl di-n-hexylphosphono acetate | 0.082 | 26.5 | 24.1 | 12.0 | 2.7 | 2.8 | 4.2 | 0.62 |
| Ex. 4 | Octadecyl Diethylphosphono acetate | 0.111 | 22.9 | 19.8 | 12.8 | 5.1 | 5.2 | 7.0 | 0.68 |
| Ex. 5 | Ethyl Diethylphosphono propionate | 0.059 | 26.6 | 23.2 | 11.5 | 6.4 | 6.6 | 6.9 | 0.74 |
| Ex. 6 | Ethyl di-n-hexylphosphono propionate | 0.085 | 24.4 | 21.6 | 9.9 | 5.3 | 5.6 | 6.2 | 0.85 |
| C. Ex. 1 | Triethyl phosphite | 0.041 | 24.2 | 16.4 | 7.5 | 2.8 | 6.4 | 10.0 | 1.67 |
| C. Ex. 2 | Triphenyl phosphite | 0.077 | 25.8 | 19.4 | 5.0 | 4.1 | 5.2 | 12.2 | 1.69 |
| C. Ex. 3 | — | 0 | 21.7 | 17.2 | 4.4 | 3.3 | 4.6 | 13.5 | 1.98 |

Ex.: Example C. Ex.: Comparative Example

Example 7

Manufacture of Poly-L-Lactic Acid Composition 100 parts by weight of L-lactide and 0.15 part by weight of stearyl alcohol were fed to a polymerization reactor equipped with a cooling distillation tube from a stock feed port in a nitrogen stream. Subsequently, the inside of the reactor was substituted by nitrogen 5 times, and L-lactide was molten at 190° C. When L-lactide was completely molten, 0.05 part by weight of tin 2-ethylhexanoate and 500 μl of toluene were added from the stock feed port to carry out polymerization at 190° C. for 1 hour. After the end of polymerization, 0.055 part by weight of ethyl diethylphosphonoacetate was added from a catalyst injection port and kneaded for 15 minutes. Finally, excess of L-lactide was removed by volatilization, and a poly-L-lactic acid composition in the form of a strand was discharged from the discharge port of the reactor and cut into a pellet while it was cooled.

Manufacture of Poly-D-Lactic Acid Composition

A poly-D-lactic acid composition was prepared in the same manner as described above. That is, 100 parts by weight of (Formation of Stereocomplex)

After 50 parts by weight of the pellet of the above poly-L-lactic acid composition and 50 parts by weight of the pellet of the poly-D-lactic acid resin composition were well mixed together, they were kneaded together by using the 50C150 Kneader Laboplast Mill of Toyo Seiki Co., Ltd. in a nitrogen gas stream at 230° C. for 10 minutes. The stereocomplex crystal content of the obtained composition was 99.7 W. The Mw and lactide content of the obtained composition are shown in Table 2.

The obtained composition was ground into grains having a diameter of 2 to 5 mm by using a grinder, and 10 g of the grains was put into a stoppered Pyrex test tube. The inside of the Pyrex test tube was substituted by nitrogen to carry out a heat stability test at 260° C. for 10 minutes. After the end of the test, the composition was taken out to measure its Mw, lactide content and ΔYI value. The measurement results are shown in Table 2.

Example 8

A composition was prepared in the same manner as in Example 7 except that 0.069 part by weight of ethyl di-n-butylphosphonoacetate was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Example 9

A composition was prepared in the same manner as in Example 7 except that 0.082 part by weight of ethyl di-n-hexylphosphonoacetate was used in place of 0.055 part by weight of ethyl diethylphosphonoacetate. The Mw, stereocomplex crystal content and lactide content of the obtained composition are shown in Table 1. The heat stability test of the composition was carried out in the same manner as in Example 7. The results are shown in Table 2.

Example 10

A composition was prepared in the same manner as in Example 7 except that 0.111 part by weight of octadecyl diethylphosphonoacetate was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Example 11

A composition was prepared in the same manner as in Example 7 except that 0.059 part by weight of ethyl diethylphosphonopropionate was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Example 12

A composition was prepared in the same manner as in Example 7 except that 0.085 part by weight of ethyl di-n-hexylphosphonopropionate was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Comparative Example 4

A composition was prepared in the same manner as in Example 7 except that 0.041 part by weight of triethyl phosphite was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Comparative Example 5

A composition was prepared in the same manner as in Example 7 except that 0.077 part by weight of triphenyl phosphite was used in place of 0.055 part by weight of ethyl diethylphosphonoacetate. The Mw, stereocomplex crystal content and lactide content of the obtained composition are shown in Table 2. The heat stability test of the composition was carried out in the same manner as in Example 7. The results are shown in Table 2.

Comparative Example 6

A composition was prepared in the same manner as in Example 7 without adding a phosphono-fatty acid ester. The Mw, stereocomplex crystal content and lactide content of the obtained composition are shown in Table 2. The heat stability test of the composition was carried out in the same manner as in Example 7. The results are shown in Table 2.

TABLE 2

| | Deactivator | | Stereocomplex crystal content (%) | Mw (unit: $10^4$) | | Lactide content (wt %) | | |
|---|---|---|---|---|---|---|---|---|
| | Type | Parts by weight | | Before heat stability test | After 10 minutes | Before heat stability test | After 10 minutes | ΔYI |
| Ex. 7 | Ethyl Diethylphosphono acetate | 0.055 | 99.7 | 12.8 | 11.8 | 3.9 | 3.9 | 0.90 |
| Ex. 8 | Ethyl di-n-butylphosphono acetate | 0.069 | 98.5 | 13.7 | 12.5 | 3.1 | 3.2 | 0.89 |
| Ex. 9 | Ethyl di-n-hexylphosphono acetate | 0.082 | 98.8 | 13.1 | 12.4 | 4.1 | 4.4 | 0.75 |
| Ex. 10 | Octadecyl Diethylphosphono acetate | 0.111 | 97.6 | 12.2 | 11.4 | 4.5 | 4.6 | 0.78 |
| Ex. 11 | Ethyl Diethylphosphono propionate | 0.059 | 99.9 | 13.6 | 12.7 | 3.8 | 4.1 | 0.84 |
| Ex. 12 | Ethyl di-n-hexylphosphono propionate | 0.085 | 96.8 | 11.9 | 10.5 | 5.0 | 5.1 | 0.94 |

TABLE 2-continued

| | Deactivator | | Stereocomplex crystal content (%) | Mw (unit: 10⁴) | | Lactide content (wt %) | | ΔYI |
|---|---|---|---|---|---|---|---|---|
| | Type | Parts by weight | | Before heat stability test | After 10 minutes | Before heat stability test | After 10 minutes | |
| C. Ex. 4 | Triethyl phosphite | 0.041 | 98.2 | 12.6 | 7.4 | 4.0 | 9.6 | 1.58 |
| C. Ex. 5 | Triphenyl phosphite | 0.077 | 99.1 | 12.7 | 8.2 | 3.3 | 7.8 | 1.62 |
| C. Ex. 6 | — | 0 | 97.3 | 12.6 | 7.4 | 3.4 | 8.2 | 2.04 |

Ex.: Example C. Ex.: Comparative Example

EFFECT OF THE INVENTION

The composition of the present invention has excellent heat stability and hardly experiences a reduction in its molecular weight at the time of heating. That is, the composition of the present invention hardly forms lactide, cyclic oligomer or chain low molecule in the step in which heating at 180° C. or higher is required such as melt spinning, melt film formation or injection molding and hardly experiences a reduction in its molecular weight. The composition of the present invention has a good color. Further, the composition of the present invention which contains a stereocomplex crystal has excellent heat resistance. Therefore, the composition of the present invention is preferred as a raw material for yarn, films or resin molded products.

INDUSTRIAL APPLICABILITY

Since the composition of the present invention has excellent heat stability, it can be melt molded into yarn, film or other form.

The invention claimed is:
1. A composition which comprises:
(i) 0.001 to 0.1 part by weight of a metal catalyst containing tin,
(ii) 0.001 to 0.5 part by weight of a phosphono-fatty acid selected from the group consisting of ethyl di-n-hexylphosphono acetate and octadecyl diethylphosphono acetate
and
(iii) 100 parts by weight of polylactic acid.
2. The composition according to claim 1, wherein the polylactic acid is poly-L-lactic acid, poly-D-lactic acid or a mixture thereof.
3. The composition according to claim 1, wherein the polylactic acid contains a stereocomplex crystal.
4. The composition according to claim 1, which contains 0.02 to 0.2 part by weight of a phosphono-fatty acid ester based on 100 parts by weight of polylactic acid.
5. A molded product of the composition of claim 1.
6. A process of manufacturing a composition which contains a stereocomplex crystal by mixing together poly-L-lactic acid and poly-D-lactic acid, wherein
at least one of poly-L-lactic acid and poly-D-lactic acid contains a metal catalyst containing tin and the mixing is carried out in the presence of 0.001 to 0.5 part by weight of a phosphono-fatty acid ester selected from the group consisting of ethyl di-n-hexylphosphono acetate and octadecyl diethylphosphono acetate based on 100 parts by weight of the total of poly-L-lactic acid and poly-D-lactic acid.

* * * * *